United States Patent [19]

Chan et al.

[11] Patent Number: 4,920,538
[45] Date of Patent: Apr. 24, 1990

[54] METHOD OF CHECKING THE EXECUTION OF MICROCODE SEQUENCES

[75] Inventors: Joni N. Chan, Los Altos Hills; Andrew Moy, San Jose, both of Calif.

[73] Assignee: International Business Machines Corporation, Armonk, N.Y.

[21] Appl. No.: 750,346

[22] Filed: Jun. 28, 1985

[51] Int. Cl.$^5$ .............................................. G06F 11/00
[52] U.S. Cl. .................................... 371/19; 371/16.1; 364/200
[58] Field of Search ................... 371/19, 25, 22, 16.1, 371/15.1, 21.1, 21.2, 25.1, 22.1, 22.2, 51.1; 364/200, 900

[56] References Cited

U.S. PATENT DOCUMENTS

| | | | |
|---|---|---|---|
| 4,074,229 | 2/1978 | Prey | 371/51 |
| 4,153,931 | 3/1979 | Green | 371/200 |
| 4,251,885 | 2/1981 | Dodt et al. | 371/60 |
| 4,315,313 | 2/1982 | Armstrong | 371/19 |
| 4,410,938 | 10/1983 | Higashiyama | 371/19 |
| 4,430,706 | 2/1984 | Sand | 364/200 |
| 4,730,315 | 3/1988 | Saito | 371/19 |

OTHER PUBLICATIONS

Shih, 26 IBM Tech. Discl. Bul. 2519, Oct. 1983, "Wild Branch Avoidance During Microcode Execution".

*Primary Examiner*—Michael R. Fleming
*Attorney, Agent, or Firm*—R. Bruce Brodie

[57] ABSTRACT

A global label (path identifier) is stored at compile time which computes a check marker along one permissible execution path of execution of a microinstruction sequence. The remaining execution paths are embedded with scalars and skip microinstructions so that execution along any conditional branch path will always yield the same global label (path identifier). Microcode sequence errors are determined at the completion of each microprogram node execution by comparing a path identifier generated at runtime with the global label stored earlier.

6 Claims, 1 Drawing Sheet

METHOD OF CHECKING THE EXECUTION OF MICROCODE SEQUENCES

TECHNICAL FIELD

The invention relates to the detecting of errors in the execution of microcode sequences, and more particularly to a method and apparatus for on-line microcode sequence error detection and fault isolation in data processing systems.

BACKGROUND OF THE INVENTION

Microprogrammed controllers exist today that are self-verifying. That is, a proper sequence of operations is checked by calculating a check key at predetermined points of the execution of the microcode sequence. The check key is stored in memory for later use in verifying proper microinstruction sequence execution. During runtime, at the last microinstruction in the sequence, a check key is generated. The generated check key is then compared with the stored check key to see if they are the same. If they are the same, then the microcode sequence was executed properly. If they differ, then the sequence is in error.

One of the problems that arises in trying to check entire microcode sequences is checking the execution of conditional branching instructions. This is because branches outside the path taken in calculating the original check key will result in different check keys being calculated for each branch path.

It is an object of the present invention to provide a microprogrammed controller that is self-verifying in which valid branches along the execution path are verified and invalid branches are detected and isolated.

SUMMARY OF THE INVENTION

The above object is accomplished in accordance with the invention by embedding, at complete time, markers which bound the set of permissible paths of execution of a microinstruction sequence. A marker is computed at runtime and is matched with the stored marker to detect any wild branches. This is accomplished by generating a global label (path identifier) which computes a check marker along one selected permissible execution path. The remaining execution paths (branches) are embedded with scalars that adjust the calculation upwards or downwards so that execution along any conditional branch path will always yield the same global label. Skip microinstructions are inserted prior to each scalar to prevent execution of the scalar during a nonbranch execution (i.e. an execution that follows the selected path).

Microcode sequence errors are determined at the completion of each microprogram path execution by comparing the sequence identifier generated along that path at runtime with the global label stored earlier.

The foregoing and other objects, features, and advantages of the invention will be apparent from the following more particular description of preferred embodiments of the invention as illustrated in the accompanying figures.

DESCRIPTION OF THE PREFERRED EMBODIMENT

AND INDUSTRIAL APPLICABILITY

Figure 1:
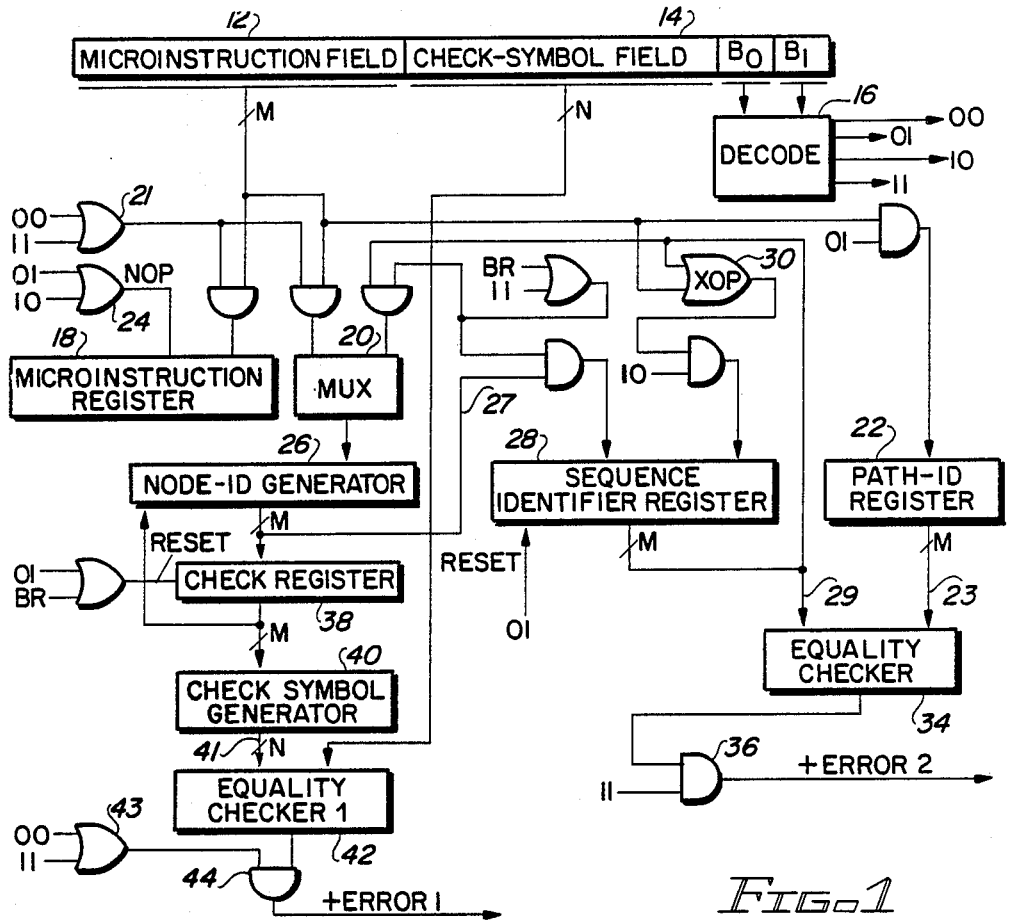
FIG. 1 is a block diagram of a portion of a microcode sequencer in which the invention is embodied.

The following abbreviations are used in this specification and in the claims:
  BR—Branch Instruction
  ID—Identifier
  MI—Microinstruction
  CR—Check Register
  CB—Check Bits
  SG—Signature Generation
  SEQ—Sequence
  MUX—Multiplexer
  NOP—No Operation
  AND—Logical AND Operation
  XOR—Logical EXCLUSIVE-OR Operation
  REG—Register
  NID—Node Identifier
  JID—Justifying Identifier
  PID—Path Identifier
  PSW—Program Status Word
  MIR—Microinstruction Register
  SIR—Sequence Identifier Register
  PIR—Path Identifier Register A block diagram of a preferred embodiment of the invention is shown in FIG. 1. This circuit requires that N check-bits (14) and two encoded ID bits, B0 and B1, be attached to the M-bit microinstruction field ($N \leq M$). The two encoded bits are defined as follows:

| B0 | B1 | (VALUE) | |
|---|---|---|---|
| 0 | 0 | (0) | Microinstruction (functional) |
| 0 | 1 | (1) | Path identifier (global label) |
| 1 | 0 | (2) | Justifying identifier (scalar) |
| 1 | 1 | (3) | Last microinstruction of the path (exit point) |

Referring now to FIG. 1, the invention is embodied within a microprocessor, the elements of which are well known in the art. The structure of FIG. 1 will be described first and then an illustrative example of microcode will be described.

The microinstruction register stores the M-bit microinstruction field (12), the check symbol field (14), comprised of N check bits, and fields B0 and B1, comprised of two encoded ID bits. The check bits are fed to a decoder (16), which decodes the two bits. The outputs of the decoder (16) are connected to the AND and OR circuits of FIG. 1 as shown in the drawing.

The microinstruction field (12) is connected to a microinstruction register (18), a multiplexer (20), and a path ID register (22). When the decoder outputs indicate a path identifier (bits B0, B1=0,1) or a justifying identifier (bits B0, B1=1,0), a "NOP" (25) is inputted to the microinstruction register. Thus, only actual functional microinstructions are executed. The node ID generator (26) is activated by the multiplexer (20) whenever a microinstruction is decoded (bits B0, B1=0,0 or 1,1) or a branch (BR) is decoded. The logical exclusive OR (30) performs a modulo-2 addition on the inputs thereto to provide a sequence identifier output from the sequence identifier register (28).

The path identifier register (22) stores a path identifier when the decoder (16) decodes the current microinstruction as being a path identifier (bits B0, B1=0,1). The equality checker-2 (34) compares the output of the sequence identifier register (29) with the output of the path identifier register (23) and produces an output which is ANDed in AND circuit (36) to provide an error indication when the last microinstruction of the path is indicated (bits B0, B1=1,1) by the decoder (16).

The check register (38) is reset every time a path identifier is decoded (bits B0, B1=0,1) or a branch instruction (BR) is indicated. The output of the check register (38) is fed back to the node ID generator (26) to perform the addition or any other signature generation) and is output to the check symbol generator (40). Check symbol generator (40) is required if the check symbol field (14) contains less bits than the microinstruction field (12).

The equality checker-1 (42) compares the check symbol field (14) of the current microinstruction with the check symbol generator output (41). The output of the equality checker-1 (42) is ANDed in AND circuit (44) with the decoder output to provide an error signal whenever the two encoded bits, B0 and B1, indicate a functional microinstruction (bits B0, B1=0,0) or the last microinstruction of the path (bits B0, B1=1,1).

Faults due to hardware and microcode failures are isolated at the microprogram node boundary by ensuring that the microprogram follows a predetermined sequence through the introduction of microprogram path identifiers (PID), and justify node identifiers (JID), into the microprogram at the associated branch-free intervals and common entry/exit points. Microcode sequence errors are determined at the completion of each microprogram path execution by comparing the generated sequence identifier with the predetermined identifier.

A special purpose precompiler may be used to insert the PIDs and JIDs for the corresponding microprogram paths into the microprogram.

For purposes of this specification, a microprogram node is defines as a single path, branch-free interval that has exactly one entry point and one exit point.

An NID is defined as a microprogram node identifier of a given node generated through a mathematical algorithm on the microinstruction (MI) of that node as given below:

$$NIDj = \sum_{i=1}^{n} MI_i = MI1 + MI2 + MI3 + \ldots + MIn$$

for n microinstruction nodes (check-sum addition).

A microprogram path node identifier (PID) is defined as an identifier on a given path generated through a mathematical operation of the node identifiers of that path:

$$PIDj = \sum_{i=1}^{n} ||NIDi||_2 = NID1 \oplus NID2 \oplus NID3 \oplus \ldots \oplus NIDn$$

for n nodes path (modulo-2 addition).

The two additional memory bits, B0 and B1, are incorporated into each microinstruction word to distinguish between the identifiers and the ordinary microinstructions. An identifier mask circuit (21, 24) is used to mask out the identifiers and prevent them from being loaded into the microinstruction register (18). The MIR (18) is loaded with a NO-Operation (NOP) microinstruction (25) whenever a word corresponding to an identifier is fetched from the program store.

Checking for microcode faults is done concurrently with the execution of each microprogram path. Fault isolation to a path is achieved by comparing the hardware-generated PID with the predetermined microprogram PID in equality checker-2 (34). Any erroneous bit pattern in a single microinstruction will generate a wrong path identifier and will therefore be detected.

A finite set of paths is derived for each microprogram. The path identifier of each path can be stored just before the first microinstruction at the entry point of that path. A justify node identifier (JID) is inserted to a path to ensure all common entry/exit paths have the same path identifiers. Common entry paths are defined as paths starting from the same node; common exit paths are defined as paths terminating at the same mode.

The path identifier is computed for sequences of nodes of a specific path rather than for individual nodes. A sequence of nodes is checked at the terminal node of that path instead of checking at each node individually.

A check symbol (14) is also incorporated with each microinstruction. This check symbol is tested at equality checker-1 (42) to provide concurrently with each microinstruction execution to provide additional microcode sequence integrity checking.

SEQUENCE OF OPERATIONS

The following describes the sequence of operations based upon the decode of bits B0 and B1:

(01) Path Identifier

When a path identifier (PID) microinstruction is encountered, signifying the start of the microcode routine, a NO-Operation (NOP) microinstruction (25) is loaded into the microinstruction register (18) while the PID from the microinstruction field is loaded into the PIR (22). The CR and SIR are reset at this time. Both the CR (38) and SIR (28) may comprise, for example, register pairs (L1/L2) used in most common LSSD (Level Sensitive Scan Design) logic designs. The data input of the L2 latch is fed directly from the output of the L1 latch, each clocked by a different system clock. A register pair is required due to the feedback nature of the design.

(00) Microinstruction

The microinstruction field (12) is loaded into the MIR (18). If the instruction is a nonbranch type, the signature (27) generated based on the contents of CR (L2) and the microinstruction field is loaded into CR (L1). This is later loaded into CR (L2). The node ID generator (26) has the signature generation function. One method of generating a signature is by check-sum addition (i.e. cumulative addition of successive microinstruction fields).

A check symbol generator (40) is required for N<M to translate the M-bit microinstruction into an N-bit word. The output (41) is compared with the predetermined check-bits (14) at equality checker-1 (42).

If the microinstruction in MIR (18) is decoded as a branch type (BR), the signature is generated in the same manner as described above. But, in addition, the generated signature of the branch-free node in CR (L2) is combined with the contents of SIR (L2) to produce an updated branch sequence signature. The result is loaded into SIR (L1) and later clocked into SIR (L2). The CR (38) is reset at the end of this operation.

(10) Justifying Identifier

When a justifying identifier (JID) is decoded (bits B0, B1=1,0), an NOP (25) is loaded into the MIR. The JID in the microinstruction field is exclusive ORed (30) with the contents of SIR (L2) and the result is loaded into SIR (L1). Next, SIR (L2) is updated with SIR (L1). The CR (38) is normally reset at this time, but it is not required if it is assumed that the JID can only follow a branch instruction.

(11) Last Microinstruction of the Path

The last microinstruction of the path (bits B0, B1=1,1) is treated in the same manner as all other functional microinstructions (bits B0, B1=0,0). But in addition, the generated signature (27) is combined with the contents of SIR (L2) to produce the final node identifier (29). This final result is compared at equality checker-2 (34) with the predetermined PID (23) stored in the PIR (22).

When an interrupt occurs, the contents of the CR, SIR, and PIR must be saved in the PSW stack and restored during the return operation.

Sequence of Operations (Summary)

```
(00)    Nonbranch:
        MIR ← MI
        CR (L1) ← CR (L2) . SG . MI
        CR (L2) ← CR (L1)
        COMPARE CR (L2), CB
(00)    Branch:
        MIR ← MI
        CR (L1) ← CR (L2) . SG . MI
        CR (L2) ← CR (L1)
        COMPARE CR (L2), CB
        SIR (L1) ← CR (L2) . SG . SIR (L2)
        SIR (L2) ← SIR (L1)
        RESET CR (L1/L2)
(01)  : MIR ← 'NOP'
        PIR ← MI
        RESET SIR (L1/L2), CR (L1/L2)
(10)  : MIR ← 'NOP'
        SIR (L1) ← SIR (L2) . XOR . MI
        SIR (L2) ← SIR (L1)
        RESET CR (L1/L2) -   Not required if it is
                             assumed that JIDs can
                             only follow branch
                             instructions
(11)  : MIR ← MI
        CR (L1) ← CR (L2) . SG . MI
        CR (L2) ← CR (L1)
        COMPARE CR (L2), CB
        SIR (L1) ← CR (L2) . SG . SIR (L2)
        SIR (L2) ← SIR (L1)
        COMPARE SIR (L2), PIR
```

Illustrative Example

Figure 2:
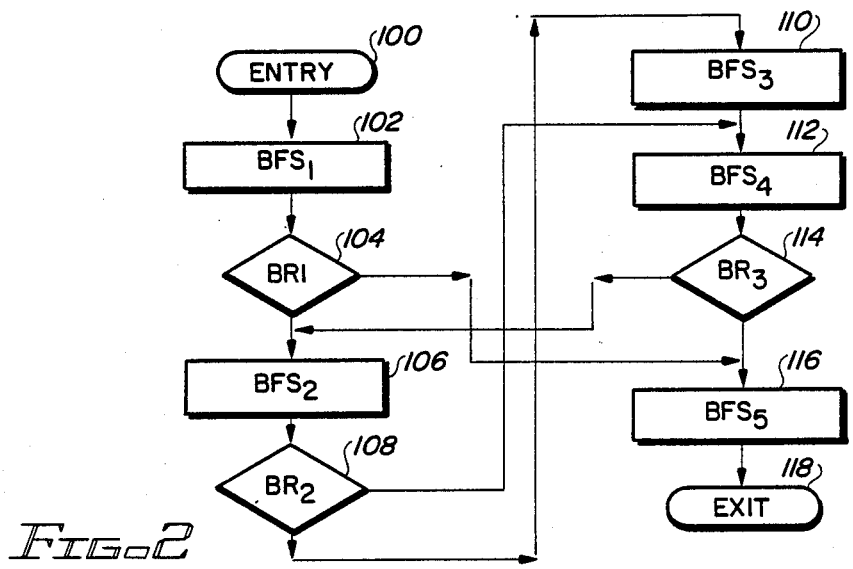
FIG. 2 is a flow diagram of a typical microprogram segment.

The flow diagram shown in FIG. 2 represents a typical microprogram segment (symbol string) consisting of an entry point (100), an exit point (118), branch-free segments (BFS) (102, 106, 110, 112, and 116), and branch decision points (104, 108, and 114). Each BFS contains one or more nonbranch microinstructions and may terminate with a branch decision point. The arrows from the branch decision points constitute the permissible paths (traversals). One possible translation of the flow diagram of FIG. 2 is shown in the symbolic microprogram segment below:

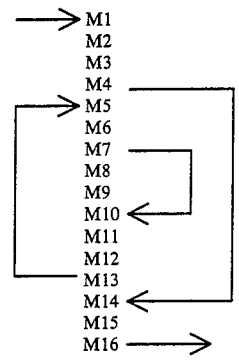

wherein:

| | |
|---|---|
| M1 = | Global Entry |
| M16 = | Global Exit |
| M4, M7, M13 = | Conditional Branch Microinstructions |
| M1, M2, M3, M4 = | BFS1 |
| M5, M6, M7 = | BFS2 |
| M8, M9 = | BFS3 |
| M10, M11, M12, M13 = | BFS4 |
| M14, M15, M16 = | BFS5. |

The objective of the present invention is to provide a method for detecting unpermissible traversals within a symbol string, the microprogram segment in the above example. This is accomplished by generating a global label indicative of one permissible traversal and scaling the remaining traversals such that transitioning along any permissible traversal always yields the same global label.

The generation of the global label consists of the following steps:

1. Select one permissible traversal along the symbol string.

2. Derive a label (numerical representation) for each character symbol (microinstruction) in the selected traversal.

3. Operate on the labels through a predetermined function (check-sum, CRC, etc.) to obtain a predetermined global label.

The predetermined global label is placed at the entry point to signify the beginning of a microprogram segment. Regeneration of the global label takes place concurrently with the microprogram execution.

In order to compute the same global label among all other permissible traversals, a scalar is inserted at each point of traversal to adjust the generated label. The generation of the global label terminates at the exit point (last microinstruction of the last BFS). Mismatch of this generated label with the predetermined global label indicates an error condition.

Distinctions between the functional microinstructions, global label, and scalars are accomplished by appending the 2-bit tag field (B0, B1) to each microinstruction.

A "No-Op" (no operation) is executed during the encounter of a global label or scalar. Sequence error checking occurs at the completion of the last microinstruction.

In this example, for simplicity, the decimal equivalence of each microinstruction is used to represent their labels, and the operation upon the labels is the check-sum method to obtain the global label. The traversal M1 to M16 (i.e. the path with no branching) is arbitrarily chosen as the permissible path of step 1 above. This is illustrated below. The numerical value in parentheses represents the label corresponding to the microinstruction:

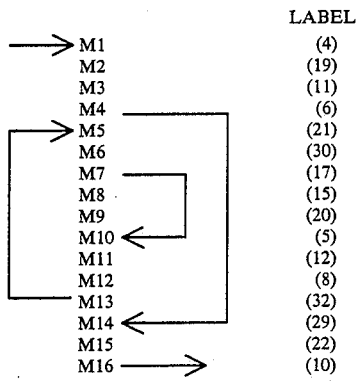

$$\text{Global Label} = \sum_{i=1}^{16} \text{Label}_i = 261$$

Finally, scalars are generated and inserted at the appropriate locations in the microprogram segment such that transitioning along any permissible traversal always yields the same global label. A SKIP microinstruction (SK) must precede each scalar to prevent erroneous execution of the scalar by a nonbranch decision from the preceding BFS. The final microprogram segment along with its associated tags is shown below:

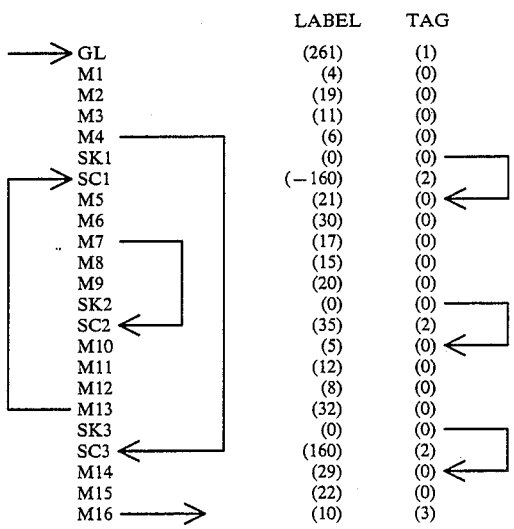

wherein:
GL = Global Label (No-Op)
Mi = Microinstructions
SKi = Skip Microinstructions
SCi = Scalers (No-Op)

It will be readily understood by those skilled in the art that several optional features can be added to enhance the error detection and fault isolation in the system.

For example, the check-sum method used for generating the global label can be substituted with more complex methods such as the cyclic redundancy check (CRC) or other signature generation schemes which provide a higher degree of error detection.

Furthermore, fault isolation may be enhanced by appending the check symbol field (14), shown in FIG. 1, to each character symbol (microinstruction). The check symbol provides the intermediate global label at the point of execution. This is compared to the generated intermediate global label such that error is indicated upon a mismatch.

Error detection and correction for each character symbol can be achieved by appending an error correction code (ECC) field to each character symbol. The number of ECC bits needed depends upon the degree of error detection and correction required in the system. ECC associates only with the appended character symbol (i.e. independent of all other character symbols in the symbol string); therefore, it does not provide sequence error detection along the symbol string. For example, the conventional parity check is a one-bit ECC providing single-bit error detection and no correction; a two-bit ECC field provides either two-bit error detection or single-bit error detection and correction.

While the invention has been particularly shown and described with reference to preferred embodiments thereof, it will be understood by those skilled in the art that various changes in form and details may be made therein without departing from the spirit and scope of the invention.

We claim:

1. A method for detecting impermissible traversals in a system in which selective traversals (jumps or branches) along extents of the symbol string are dictated by embedded pointers, and further in which the symbol string includes single entrance, single exit (SESE) substrings, comprising the steps of:
   (a) processing the symbol string by:
      (1) deriving the labeling ones of a set of permissible traversals from the SESE substrings;
      (2) generating a global label indicative of one permissible traversal through the symbol string of the set of permissible traversals and then scaling the labels obtained in step (a1) of remaining ones of the set of permissible traversals such that transitioning along a permissible traversal always yields the same global label;
      (3) embedding the labels within SESE substrings;
   (b) executing the processed symbol string by:
      (4) reading the SESE substrings from a boundary (entrance/exit) of an arbitrary substring to a boundary of another arbitrary substring and computing from each read substring at least one label indicative of the traversal; and
      (5) comprising the embedded label with computed label such that a mismatch is indicative of error.

2. A method according to claim 1, wherein the derivation and labeling of permissible traversals (step 1) includes the step of:
   deriving a coded numerical symbol as a predetermined function of the sequence of symbols in the corresponding SESE substring.

3. A method of verifying correct execution of a string of sequential microinstructions, comprising the steps of:
   (a) deriving a numerical representation (label) for each microinstruction in one selected permissible traversal in the microinstruction string;

(b) operating on said derived numerical representations (labels) through a predetermined function to obtain a predetermined global label;

(c) storing said predetermined global label at the entry point of said microinstruction string to signify the beginning of a microprogram segment;

(d) at runtime, regenerating said global label concurrently with execution of the string of microinstructions;

(e) at runtime, comparing said regenerated global label with said predetermined global label at the conclusion of execution of said microinstruction string.

4. A method according to claim 3, further comprising the step of placing said global label at the entry point of said microinstruction sequence to signify the beginning of a microprogram segment.

5. A method according to claim 3, further comprising the step of inserting a scalar at each point of traversal to adjust said generated label so that the same final result is generated regardless of the path of execution.

6. A method according to claim 5, further comprising the step of inserting a skip microinstruction prior to each of said scalar microinstructions to thereby prevent erroneous execution of said scalar by a nonbranch decision from a preceding branch-free segment.

* * * * *

UNITED STATES PATENT AND TRADEMARK OFFICE
CERTIFICATE OF CORRECTION

PATENT NO. :  4,920,538

DATED       :  April 24, 1990

INVENTOR(S) :  J. N. Chan et al

It is certified that error appears in the above-identified patent and that said Letters Patent is hereby corrected as shown below:

ON TITLE PAGE: delete "Joni N. Chan", insert --Johni N. Chan--

Signed and Sealed this

Eighth Day of October, 1991

Attest:

HARRY F. MANBECK, JR.

*Attesting Officer*     *Commissioner of Patents and Trademarks*